US011077645B2

(12) United States Patent
Inoue et al.

(10) Patent No.: US 11,077,645 B2
(45) Date of Patent: Aug. 3, 2021

(54) COVER MEMBER AND DISPLAY DEVICE

(71) Applicant: AGC Inc., Chiyoda-ku (JP)

(72) Inventors: Atsushi Inoue, Chiyoda-ku (JP);
Yasuhiro Inoue, Chiyoda-ku (JP);
Kyohei Hashimoto, Chiyoda-ku (JP);
Takashi Shibuya, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 0 days.

(21) Appl. No.: 16/238,579

(22) Filed: Jan. 3, 2019

(65) Prior Publication Data

US 2019/0134940 A1  May 9, 2019

Related U.S. Application Data

(63) Continuation of application No. PCT/JP2017/027541, filed on Jul. 28, 2017.

(30) Foreign Application Priority Data

Aug. 3, 2016 (JP) .............................. JP2016-152756
Oct. 14, 2016 (JP) .............................. JP2016-202684

(51) Int. Cl.
*B32B 17/10* (2006.01)
*G02F 1/1333* (2006.01)
(Continued)

(52) U.S. Cl.
CPC ........ *B32B 17/10082* (2013.01); *B32B 3/263*
(2013.01); *B32B 7/12* (2013.01);
(Continued)

(58) Field of Classification Search
CPC ........ B32B 17/10155; B32B 17/10293; B32B 17/10302; B32B 1/04; B32B 2307/538;
(Continued)

(56) References Cited

U.S. PATENT DOCUMENTS 4,901,476 A * 2/1990 Nagashima ....... B32B 17/10036
49/475.1
5,506,057 A * 4/1996 Olson ............... B32B 17/10137
428/425.6
(Continued)

FOREIGN PATENT DOCUMENTS

EP  1829675 A1 *  9/2007 ....... B32B 17/10036
JP  5-62539 U  8/1993
(Continued)

OTHER PUBLICATIONS

Machine translation of JP 2007/197288 A, obtained from Espacenet (Year: 2020).*

(Continued)

*Primary Examiner* — Z. Jim Yang
(74) *Attorney, Agent, or Firm* — Oblon, McClelland, Maier & Neustadt, L.L.P.

(57) ABSTRACT

To provide a cover member excellent in edge safety, and a display device in which said cover member is used. A cover member which covers a display panel of a display device and which has a front surface that does not face the display panel and a rear surface that faces the display panel, said cover member being a laminate in which a first glass plate constituting said front surface and a second glass plate constituting said rear surface are bonded via an intermediate film interposed therebetween, wherein the first glass plate has a first inside chamfer which is a chamfer on the intermediate film side, and the first inside chamfer and the second glass plate or the intermediate film are bonded by a resin.

20 Claims, 5 Drawing Sheets

(51) Int. Cl.
*G09F 9/00* (2006.01)
*C03C 21/00* (2006.01)
*B32B 3/26* (2006.01)
*B32B 7/12* (2006.01)

(52) U.S. Cl.
CPC ........ *B32B 17/10* (2013.01); *B32B 17/10036* (2013.01); *B32B 17/10155* (2013.01); *B32B 17/10293* (2013.01); *B32B 17/10302* (2013.01); *B32B 17/10761* (2013.01); *C03C 21/00* (2013.01); *G02F 1/1333* (2013.01); *G09F 9/00* (2013.01); *B32B 2307/538* (2013.01); *B32B 2457/20* (2013.01); *C03C 21/002* (2013.01); *G02F 2201/50* (2013.01)

(58) Field of Classification Search
CPC ..... Y10T 428/24777; Y10T 428/24355; G02F 1/133305; G06F 1/1652
See application file for complete search history.

(56) References Cited

U.S. PATENT DOCUMENTS

| | | | | |
|---|---|---|---|---|
| 5,545,277 | A * | 8/1996 | Hashemi | B28D 1/00 156/106 |
| 5,908,675 | A * | 6/1999 | Marquardt | B32B 17/10036 428/34 |
| 6,077,374 | A * | 6/2000 | Hopfe | B32B 17/10981 156/102 |
| 2001/0001686 | A1* | 5/2001 | Kishida | B24B 9/10 428/192 |
| 2009/0019798 | A1* | 1/2009 | Teschner | B32B 17/10018 52/204.55 |
| 2009/0123762 | A1* | 5/2009 | Wiand | C09K 9/00 428/426 |
| 2009/0250568 | A1* | 10/2009 | Morita | B32B 17/06 248/176.1 |
| 2010/0227175 | A1* | 9/2010 | Saka | B29C 66/542 428/426 |
| 2011/0045280 | A1* | 2/2011 | Varma | B32B 17/10302 428/332 |
| 2012/0121912 | A1* | 5/2012 | Varma | B32B 17/10761 428/413 |
| 2012/0202030 | A1 | 8/2012 | Kondo et al. | |
| 2013/0299856 | A1* | 11/2013 | Verger | B60Q 3/208 257/88 |
| 2014/0349058 | A1* | 11/2014 | Inoue | B32B 17/1099 428/78 |
| 2015/0110991 | A1* | 4/2015 | Miwa | C03B 33/04 428/77 |
| 2015/0147538 | A1* | 5/2015 | Ishimaru | C03C 21/002 428/192 |
| 2015/0351261 | A1* | 12/2015 | Lee | H05K 5/02 361/679.01 |
| 2016/0250825 | A1* | 9/2016 | Cleary | B32B 17/10137 428/215 |
| 2016/0282527 | A1* | 9/2016 | Saito | C03B 33/091 |
| 2016/0356942 | A1* | 12/2016 | Cherekdjian | G02B 6/0051 |
| 2017/0259532 | A1* | 9/2017 | Eckelt | B32B 17/1099 |
| 2018/0200995 | A1* | 7/2018 | Moore | B32B 17/10155 |
| 2020/0016870 | A1* | 1/2020 | Bard | B32B 17/10302 |
| 2020/0307173 | A1* | 10/2020 | Dohn | B32B 37/12 |

FOREIGN PATENT DOCUMENTS

| | | | |
|---|---|---|---|
| JP | 7-232937 | 9/1995 | |
| JP | 2007197288 A * | 8/2007 | ....... B32B 17/10036 |
| JP | 2011-11941 | 1/2011 | |
| JP | WO2011/048978 | 4/2011 | |
| JP | WO2014/098160 | 6/2014 | |
| JP | 2015-34107 | 2/2015 | |
| JP | WO2015/098641 | 7/2015 | |
| WO | WO 2011/148990 A1 | 12/2011 | |

OTHER PUBLICATIONS

Machine translation of JP 2011/011941 A, obtained from Espacenet (Year: 2020).*
Machine translation of JP 2015/034107 A, obtained from Espacenet (Year: 2020).*
International Search Report dated Oct. 31, 2017 in PCT/JP2017/027541, filed on Jul. 28, 2017 (with English Translation).

* cited by examiner

COVER MEMBER AND DISPLAY DEVICE

TECHNICAL FIELD

The present invention relates to a cover member suitable for an in-vehicle display device, and an in-vehicle display device having the same.

BACKGROUND ART

Heretofore, in a display device, a protective member (cover member) for protecting a display panel such as a liquid crystal panel has been used (e.g. see Patent Document 1).

PRIOR ART DOCUMENT

Patent Document

Patent Document 1: WO2011/148990

DISCLOSURE OF INVENTION

Technical Problem

In a vehicle such as an automobile, an in-vehicle display device such as a car navigation device is mounted. A car navigation device is mainly used by an occupant of the front seat (driver seat or passenger seat), and in many cases, it is used in a state set upright on the outer surface of the dashboard, or in a state embedded in the dashboard.

Further, in recent years, an in-vehicle display device for a rear seat, specifically a rear seat entertainment (RSE) device whereby an occupant of the rear seat will watch projected images, etc., has become popular, and, for example, it is used as attached to the back surface side of the front seat in many cases.

In these in-vehicle display devices, a cover member for the display panel is used. Further, there may be a case where as the cover member, a laminated glass is used.

Meanwhile, at the time when a collision accident of a vehicle occurs, there may be a case such that the head of the occupant or the like collides with the vicinity of the edge of the cover member, whereby the edge of the cover member will be broken. At that time, from the viewpoint of the safety of the edge of the cover member (hereinafter referred to also as edge safety) to the occupant, it is desired that sharp broken fragments will remain without being scattered.

The tips, etc. of broken fragments remained without being scattered may, sometimes, rise beyond the surface of the cover member (the surface on the side not facing the display panel), and in such a case, from the viewpoint of edge safety, it is desired to reduce the rising amount of the broken fragments.

Accordingly, it is an object of the present invention to provide a cover member excellent in edge safety and a display device using the same.

Solution to Problem

The present inventors have made intensive studies in order to achieve the above object and, as a result, have found that by adhering a resin to a chamfer on the intermediate film side in a first glass plate constituting the surface (front surface) of the cover member being a laminate (laminated glass) and by adhering this resin to a second glass plate constituting the rear surface of the cover member, or to the intermediate film, it is possible, even when the edge of the cover member is broken by a collision accident, to prevent sharp broken fragments from being scattered, or to reduce the rising amount of broken fragments, and thus have accomplished the present invention.

That is, the cover member according to the first embodiment of the present invention is a cover member which covers a display panel of a display device and which has a front surface that does not face to the display panel, and a rear surface that faces the display panel, said cover member being a laminate in which a first glass plate constituting the front surface, and a second glass plate constituting the back surface are bonded via an intermediate film interposed therebetween, wherein the first glass plate has a first inner chamfer which is a chamfer on the intermediate film side, and the first inner chamfer and the second glass plate or the intermediate film are bonded by a resin.

The display device according to the first embodiment of the present invention is a display device having the above-described cover member and a display panel that is covered by the cover member.

The cover member according to the second embodiment of the present invention is a cover member which covers a display panel of a display device and which has a front surface that does not face to the display panel and a back surface that faces the display panel, said cover member being a laminate in which a first glass plate constituting the front surface and a second glass plate constituting the rear surface are bonded via an intermediate film interposed therebetween, wherein the adhesive force between the first glass plate and the intermediate film is larger than the adhesive force between the second glass plate and the intermediate film.

The display device according to the second embodiment of the present invention is a display device having the above-described cover member.

Advantageous Effects of Invention

According to the present invention, it is possible to provide a cover member excellent in edge safety and visibility and particularly suitable for an in-vehicle display device, and a display device using the same, particularly suitable for an in-vehicle display device.

DESCRIPTION OF EMBODIMENTS

Hereinafter, embodiments of the present invention will be described with reference to the drawings. The following embodiments will be described with respect to the cover member for an in-vehicle display device as an example, but the present invention is not limited thereto. Without departing from the present invention, various modifications and substitutions may be made to the following embodiments, and the cover member may be used also for a display device in a mobile body such as an aircraft, a linear motor car, etc. other than a vehicle.

<In-Vehicle Display Device>

Figure 1:
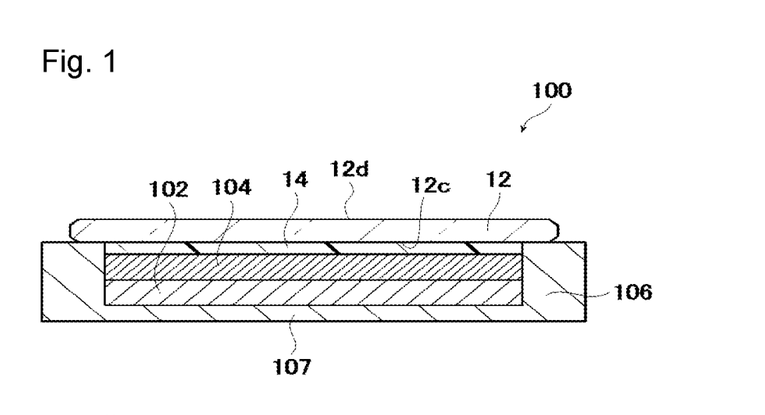
FIG. 1 is a schematic cross-sectional view showing an example of an in-vehicle display device.

FIG. 1 is a schematic cross-sectional view showing an in-vehicle display device 100. The in-vehicle display device 100 shown in FIG. 1 is, for example, a rear seat entertainment (RSE) device, which is used as attached to the back surface side of the front seat of a motor vehicle.

The in-vehicle display device 100 has a housing 106 to accommodate various parts. On a housing bottom plate 107 being the bottom plate of the housing 106, a backlight unit 102 is mounted, and on the backlight unit 102, a display panel 104 is mounted. The display panel 104 is, for example, a liquid crystal panel. The housing 106 has an opening (not shown) formed.

The construction of the backlight unit 102 and the display panel 104 is not particularly limited, and may be known construction. Likewise, the material, etc. of the housing 106 (including the housing bottom plate 107) are not particularly limited.

The in-vehicle display device is not limited to one having a liquid crystal panel as a display panel, and may be, for example, be an in-vehicle display device having e.g. an organic EL panel, PDP or an electronic-ink type panel. It may have a touch panel or the like.

As shown in FIG. 1, a cover member 12 is bonded by an adhesive layer 14 to the display panel 104. The cover member 12 functions as a protective member for the display panel 104.

The cover member 12 has a rear surface 12c that faces the display panel 104 and, on the opposite side to the rear surface 12c, a front surface 12d that does not face the display panel 104.

Here, FIG. 1 shows an embodiment wherein the edge of the cover member 12 is exposed without being housed in the housing 106. However, the mode is not limited to this embodiment and may, for example, be an embodiment wherein the edge surface of the cover member 12 is in contact with the inner wall surface of the housing 106, or an embodiment wherein the housing 106 covers the edge of the cover member 12.

The adhesive layer 14 is transparent like the cover member 12, and the difference in refractive index between the cover member 12 and the adhesive layer 14 is preferably small.

The adhesive layer 14 may, for example, be a layer made of a transparent resin obtainable by curing a curable liquid resin composition. Otherwise, the adhesive layer 14 may be an OCA (Optical Clear Adhesive) film or tape. The thickness of the adhesive layer 14 is, for example, from 5 to 400 µm, preferably from 50 to 200 µm.

First Embodiment of Cover Member

Figure 2:
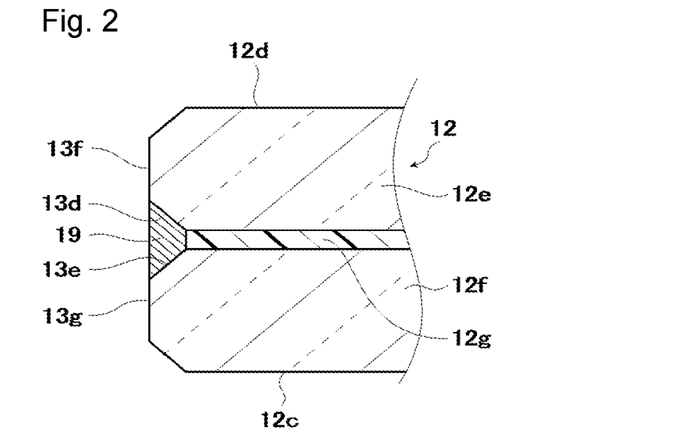
FIG. 2 is a schematic cross-sectional view showing, as enlarged, the edge of the cover member according to the first embodiment.

The cover member 12 according to the first embodiment will be described with reference to the drawings. FIG. 2 is a schematic cross-sectional view showing, as enlarged, the edge of the cover member 12.

The cover member 12 is a laminate (hereinafter referred to also as laminated glass), and a first glass plate 12e constituting the front surface 12d and a second glass plate 12f constituting the rear surface 12c are bonded via an intermediate film 12g interposed therebetween.

In this specification, the first glass plate means a glass plate of the outermost layer of the cover member. Further, the second glass plate means a glass plate which is bonded to the first glass plate and which is disposed as a layer second from the front surface of the cover member. Therefore, in a case where the cover member is made of two glass plates, the first glass plate is a glass plate disposed as the outermost layer, and the second glass plate is the rearmost layer, i.e. a glass plate facing the display panel.

The edge of the first glass plate 12e is chamfered at least at the intermediate film 12g side. That is, the first glass plate 12e has a first inside chamfer 13d being a chamfer on the intermediate film 12g side.

And, a resin 19 is adhered to the first inside chamfer 13d. Further, the resin 19 is adhered to at least one of the second glass plate 12f and the intermediate film 12g. Thus, at the time when a collision occurs, and even if the head of an occupant collides to the cover member 12 from the front surface 12d side, and the edge of the first glass plate 12e is broken, it is possible to prevent sharp broken fragments from being scattered, and to reduce the rising amount of broken fragments remained without being scattered. That is, the cover member is excellent in edge safety.

The present invention is not limited to the embodiment wherein only the first inside chamfer 13d is formed, and, as shown in FIG. 2, it is preferred that chamfers are formed at the upper and lower sides of the edges of the first glass plate 12e and the second glass plate 12f.

Thus, for example, in the case of producing or transporting the cover member 12, it is possible to prevent "chipping" from occurring by collision of another glass plate or other object to the edges of the first glass plate 12e and the second glass plate 12f.

The chamfer may be a so-called C-chamfer or may be a so-called R-chamfer. The C-chamfer is a chamfer wherein the surface formed by chamfering is planar or substantially planar (see FIG. 2). On the other hand, the R-chamfer is a chamfer wherein the surface formed by chamfering is curved.

Here, a chamfer formed on the second glass plate 12f on its intermediate film 12g side will be referred to as a second inside chamfer 13e.

The resin 19 may be adhered, not only to the first inside chamfer 13d, but also to the second inside chamfer 13e as shown in FIG. 2. Thus, broken fragments of the edge of the second glass plate 12f become to have high adhesive strength whereby the falling-off preventing effect will be high. Further, the rising prevention effect of the second glass plate 12f and the display panel 104 will be high.

In this embodiment, as shown in FIG. 2, the first glass plate 12e and the second glass plate 12f respectively have a side surface 13f and a side surface 13g. The side surface 13f and the side surface 13g may be a surface formed by chamfering or may be a part of the edge surface that has not been chamfered.

The protruding amount of the resin 19, from the side surface position of the first glass plate 12e and the second glass plate 12f is preferably small.

Here, the "side surface position of the first glass plate 12e and the second glass sheet 12f" will be described. First, as shown in FIG. 2, when the cover member 12 is viewed in cross section, in a case where the position in the lateral direction (in the horizontal direction in FIG. 2) of the side surface 13f and the side surface 13g is the same, the "side surface position . . . " is the same position in the position in the lateral direction of the side surface 13f or the side surface 13g.

On the other hand, in a case where there is a deviation in the lateral position of the side surface 13f and the side surface 13g, as between the side surface 13f and the side surface 13g, the position of one more distant from the center of the cover member 12 is taken as the "side surface position . . . ".

The protruding amount of the resin 19, from the side surface position of the first glass plate 12e and the second glass plate 12f is preferably at most 0.1 mm. Thus, for example, it is possible to avoid a trouble in construction such that the cover member 12 cannot be accommodated in a case (not shown) having the size preliminarily determined.

Figure 3:
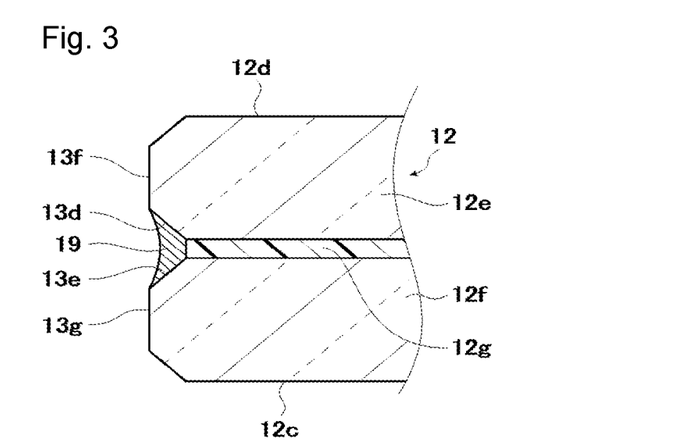
FIG. 3 is a schematic cross-sectional view showing, as enlarged, the edge of another example of the cover member according to the first embodiment.

FIG. 3 is a schematic cross-sectional view showing, as enlarged, the edge of another example of the cover member.

The resin 19 may, so long as it is adhered to the first inner chamfer 13d, be such that its exposed surface may not be a planar surface (see FIG. 2) and it may, for example, be such that, as shown in FIG. 3, the exposed surface of the resin 19 may be recessed in the lateral direction to have a concave shape.

"Surface Roughness"

The surface roughness Ra of the first inside chamfer 13d of the first glass plate 12e is preferably at least 100 nm, more preferably at least 140 nm, further preferably at least 200 nm. Thus, the resin 19 enters into irregularities of the first inside chamfer 13d to exhibit an anchor effect, and the effect to let broken fragments remain without being scattered, becomes better, whereby edge safety will be better. The upper limit of the surface roughness Ra of the first inside chamfer 13d is not particularly limited, but may, for example, be at most 500 nm.

The second inside chamfer 13e of the second glass plate 12f may not necessarily have the same surface roughness Ra as the first inside chamfer 13d of the first glass plate 12e, but it is preferred to have the surface roughness Ra in the same range including the preferred range.

In FIGS. 2 and 3, since irregularities of the inside chamfers 13d and 13e are sufficiently small as compared to e.g. the plate thickness, such irregularities are not shown.

The surface roughness Ra (arithmetic average roughness) in the present invention was measured in accordance with JIS B 0601: 2001 by means of a laser microscope "VK-9500" manufactured by KEYENCE CORPORATION, and the cut-off value $\lambda_c$ was set to be 0.25 mm.

Here, the direction of machining scratches on the first inside chamfer 13d to be caused by chamfering, is a horizontal direction (in FIG. 2, the direction toward the front side from the back side, or the opposite direction). The direction of movement of the stylus at the time of measuring the surface roughness Ra is set to be identical to the direction of the machining scratches.

With respect to the first glass plate 12e and the second glass plate 12f, the methods for chamfering and adjusting the surface roughness Ra are not particularly limited. For example, methods such as polishing by means of a chamfering wheel, laser processing (e.g. laser processing disclosed in WO2015/098641), brush polishing (e.g. polishing by means of a brush polishing apparatus disclosed in WO2015/108076), etc. may be used alone or in combination as the case requires.

Specifically, for example, by means of a chamfering wheel, the edge of the first glass plate 12e is polished to carry out chamfering to form a chamfered portion including a first inside chamfer 13d. The same applies to the second glass plate 12f. At that time, by using a chamfering wheel with rough granularity, it is possible to roughen the surface roughness of the inside chamfer 13d.

As another method, for example, by laser processing disclosed in paragraphs 0028 to 0048 of WO2015/098641, chamfering of the first glass plate 12e is carried out to form a chamfered portion including a first inside chamfer 13d. At this time point, chamfer is a specular surface. Then, by using the chamfering wheel with rough granularity, only the inside chamfer 13d is polished to roughen the surface roughness.

"Intermediate Film"

The resin to constitute the intermediate film 12g, is not particularly limited, and a conventional known resin may be used. For example, PVB (polyvinyl butyral), EVA (ethylene vinyl acetate), etc. may be suitably used. The film thickness of the intermediate film 12g is not particularly limited and may, for example, be from 0.3 to 1.5 mm. The intermediate film 12g may be composed of a plurality of layers.

"Resin"

As the resin 19, for example, the same resin as the resin to constitute the intermediate film 12g may be preferably used, and as specific examples thereof, PVB (polyvinyl butyral), EVA (ethylene vinyl acetate), etc. may be mentioned, but not limited to these resins, it is possible to use, for example, an acrylic resin, a silicone resin, an urethane acrylate resin or an epoxy resin, which is used as a commercially available adhesive.

For example, first, a cover member 12 is prepared in a complete state except for the resin 19, and the resin 19 in an uncured state is applied or embedded in a recess formed by the first inside chamfer 13d, the edge surface of the intermediate film 12g and the second inside chamfer 13e of the cover member 12, followed by curing, to attain such a state that the resin 19 is adhered to the first inside chamfer 13d, the edge surface of the intermediate film 12g and the second inside chamfer 13e.

"Tempered Glass"

It is preferred to use tempered glass for at least the first glass plate 12e among the first glass plate 12e and the second glass plate 12f that constitute the cover member 12.

The tempered glass may typically be chemically tempered glass or physically tempered glass. Among them, chemically tempered glass is preferred from the viewpoint of the strength, design quality, cost reduction, etc. and for such a reason that it is possible to reduce the sharpness of broken fragments.

On the surface of the tempered glass, a compressive stress layer is formed. The thickness (DOL) of the compressive stress layer is, for example, at least 10 μm, and from the viewpoint of durability against scratches, etc., preferably at least 15 μm, more preferably at least 25 μm, further preferably at least 30 μm.

The surface compressive stress (CS) in the compressive stress layer of tempered glass is, for example, at least 500

MPa, preferably at least 650 MPa, more preferably at least 750 MPa. The upper limit is not particularly limited and may, for example, be at most 1,200 MPa.

The method for obtaining tempered glass (chemically tempered glass) by subjecting glass to chemical tempering treatment may typically be a method of immersing glass in a molten salt solution such as a $KNO_3$ molten salt to carry out ion-exchange treatment, followed by cooling to around room temperature. The treatment conditions such as the temperature of the $KNO_3$ molten salt, dipping time, etc. may be set so that the surface compressive stress and the thickness of the compressive stress layer will become the respective desired values.

The type of glass may, for example, be soda lime glass, aluminosilicate glass ($SiO_2$—$Al_2O_3$—$Na_2O$-type glass), etc. Among them, from the viewpoint of strength, aluminosilicate glass is preferred.

The glass material may, for example, be a glass material comprising, as represented by mol %, from 50 to 80% of $SiO_2$, from 1 to 20% of $Al_2O_3$, from 6 to 20% of $Na_2O$, from 0 to 11% of $K_2O$, from 0 to 15% of MgO, from 0 to 6% of CaO and from 0 to 5% of $ZrO_2$.

Glass for chemical tempering based on aluminosilicate glass (e.g. Dragontrail (registered trademark), manufactured by Asahi Glass Company, Limited) may also be suitably used.

"Thickness, Size and Shape"

The plate thickness of each of the first glass plate 12e and the second glass plate 12f that constitute the cover member 12, is preferably from 0.5 to 2.5 mm. When the above plate thickness is within this range, the durability will be high against bending fracture of the rear surface 12c in the case of conducting the head impact test as described below, such being preferred. For the same reason, the above plate thickness is more preferably from 0.7 to 2.0 mm, further preferably from 1.3 to 2.0 mm.

The shape and size of the outer shape of the cover member 12 may suitably be determined in accordance with the outer shape of the in-vehicle display device. In the case of an in-vehicle display device, etc., the outer shape is usually rectangular such as a rectangle, and in that case, the outer shape of the cover member 12 is rectangular.

Depending upon the outer shape of the in-vehicle display device, it is possible to use a cover member 12 having a shape including a curve in its outer shape, to cover the entire surface of the display surface of the display panel.

That is, the shape of the cover member 12 may, for example, be a flat shape when viewed in cross section (see FIG. 2). Further, the shape of the cover member 12 is not limited to this, and may be a curved plate shape wherein the front surface 12d side is curved in a convex shape and the rear surface 12c side is curved in a concave shape, or the front surface 12d side is curved in a concave shape and the rear surface 12c side is curved in a convex shape.

As an example of the size of the cover member 12, for example, in the case of a rectangular shape, from 100 to 900 mm in the longitudinal direction and from 40 to 500 mm in the lateral direction, may be mentioned.

The method for producing a cover member 12 is basically the same as the method for producing a conventional laminated glass except for the point of conducting the chamfering processing of the first glass plate 12e and the point of arranging the resin 19.

Specifically, for example, first, glass plates are subjected to the above-described various processing or treatments (such as chamfering processing, adjustment of the surface roughness of the chamfer, chemical tempering treatment, etc.) to obtain the first glass plate 12e and the second glass plate 12f.

Then, an intermediate film 12g is placed between the first glass plate 12e and the second glass plate 12f, followed by pressing under predetermined pressing conditions to obtain a laminated glass.

The pressing conditions for obtaining the laminated glass are not particularly limited.

For example, the pressing pressure is preferably from 0.5 to 3.0 MPa, more preferably from 1.0 to 2.0 MPa. The pressing temperature is preferably from 70 to 200° C., more preferably from 90 to 160° C. The pressing time is preferably from 5 to 60 minutes, more preferably from 10 to 40 minutes.

Figure 4:
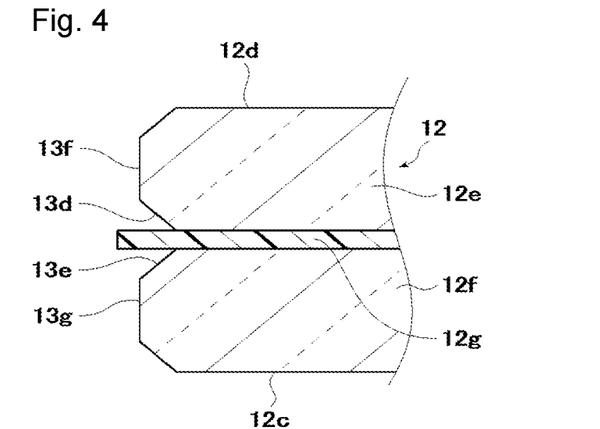
FIG. 4 is a schematic cross-sectional view showing the edge of laminated glass after pressing.

FIG. 4 is a schematic cross-sectional view showing the edge of the laminated glass after pressing.

At the time of conducting the above pressing, an intermediate film 12g larger than the size of the first glass plate 12e and the second glass plate 12f is used in many cases. In such cases, the obtainable laminated glass will be in a state where the edge of the intermediate film 12g is projected, as shown in FIG. 4. Such an edge (hereinafter referred to also as a "protruding edge") of the intermediate film 12g is unnecessary and thus will be cut off. The cutting-off method is not particularly limited, and a known method may suitably be employed.

Here, from FIG. 4, it is apparent that only by simply conducting the pressing by placing the intermediate film 12g between the first glass plate 12e and the second glass plate 12f, it is not possible to obtain a cover member 12 having a resin 19 adhered to the first inside chamfer 13d (see FIGS. 2 and 3).

Figure 5:
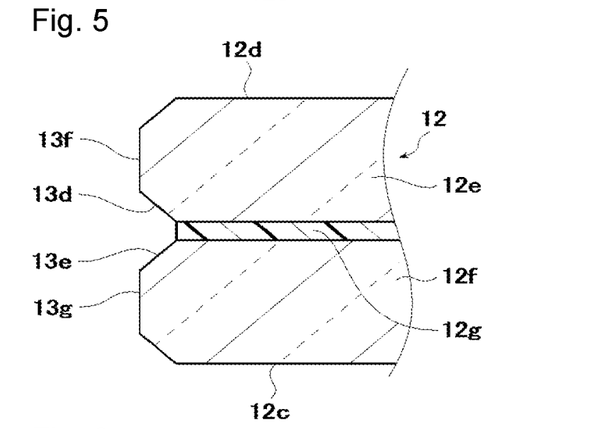
FIG. 5 is a schematic cross-sectional view showing the edge of the laminated glass in a state having the protruding edge of the intermediate film cut off.

FIG. 5 is a cross-sectional view showing a laminated glass in a state where the protruding edge of the intermediate film has been cut off.

As the protruding edge of the intermediate film 12g is cut off, as shown in FIG. 5, the edge surface of the intermediate film 12g will, together with the first inside chamfer 13d and the second inside chamfer 13e, form a recess in which the resin 19 (not shown in FIG. 5) will be disposed.

Next, in the recess formed by the inside chamfer 13d of the first glass, the edge surface of the intermediate film 12g and the inside chamfer 13e of the second glass, a resin 19 in an uncured state is applied and then cured. Thus, it is possible to obtain a cover member 12 (see FIGS. 2 and 3) wherein the resin 19 is adhered to the first inside chamfer 13d.

Second Embodiment of Cover Member

Figure 6:
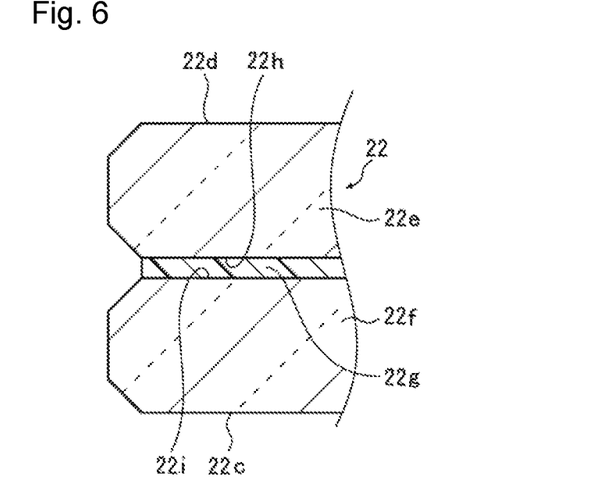
FIG. 6 is a schematic cross-sectional view showing, as enlarged, the edge of the cover member according to the second embodiment.

A cover member 22 according to the second embodiment will be described with reference to the drawings. The cover member 22 according to the second embodiment has the technical features as described in the first cover member 12, unless otherwise specified, and in the following description, overlapping description will be omitted.

FIG. 6 is a schematic cross-sectional view showing, as enlarged, the edge of the cover member 22. The cover member 22 is a laminate in which a first glass plate 22e constituting the front surface 22d, and a second glass plate 22f constituting the rear surface 22c are bonded via an intermediate film 22g interposed therebetween. The surface in contact with the intermediate film 22g of the first glass plate 22e will be referred to as a first adhesion surface 22h, and the surface in contact with the intermediate film 22g of the second glass plate 22f will be referred to as a second adhesion surface 22i.

"Adhesive Force"

In this embodiment, the adhesive force F1 between the first glass plate 22e and the intermediate film 22g is larger than the adhesive force F2 between the second glass plate 22f and the intermediate film 22g. Thus, even if the first glass plate 22e is broken by such an energy that an occupant's head has collided like during a collision accident, it is possible to let sharp broken fragments remain without being scattered and to reduce the rising amount of broken fragments remained without being scattered, and the safety is thus excellent.

So long as the adhesive force F1 is larger than the adhesive force F2, the respective specific degrees of the adhesive force F1 and the adhesive force F2 are not particularly limited. With a view to suppressing breakage of the first glass plate 22e, and, when broken, to letting broken fragments remain without being scattered and reducing the rising amount of the broken fragments remained without being scattered, the difference between the adhesive force F1 and the adhesive force F2 is preferably at least 5 N/25 mm, more preferably at least 10 N/25 mm.

Here, the adhesive force F1 is preferably at least 13 N/25 mm, more preferably at least 15 N/25 mm, further preferably at least 20 N/25 mm. Further, the adhesive force F2 is preferably less than 13 N/25 mm, more preferably at most 8 N/25 mm, further preferably at most 7 N/25 mm.

The adhesive force F1 and the adhesive force F2 are values measured by peeling the intermediate film 22g from the first glass plate 22e and the second glass plate 22f by a 180° peel tensile test.

Here, in a case where the adhesive force F1 and the adhesive force F2 as described above cannot be measured in such a state that the cover member 22 is left to stand as it is, they may be measured as follows by peeling the first glass plate 22e and the second glass plate 22f from the cover member 22. Here, the specific details of the measurement method are as described in Examples.

First, the glass plate (the first glass plate 22e or the second glass plate 22f) is cut in a width of 25 mm. To the surface (the first adhesion surface 22h or the second adhesion surface 22i) to measure the adhesive force in the cut glass plate, the intermediate film 22g is bonded. By the 180° peel tensile test, the intermediate film 22g is pulled at a speed of 50 mm/min. to measure the adhesive force (F1 or F2). The film thickness of the intermediate film 22g at the time of measuring the adhesive force is not particularly limited, and it is possible to use the film thickness of the intermediate film 22g in the cover member 22. In a case where the film thickness of the intermediate film 22g in the cover member 22 is not yet decided, it is typically possible to use a film thickness of 30 milli-inches (about 0.76 mm) in the measurement of the adhesive force between the glass plate and the intermediate film 22g.

"Surface Roughness"

The method for making the adhesive force F1 larger than the adhesive force F2 may, for example, be a method of making the surface roughness (e.g. the surface roughness Ra) of the first adhesion surface 22h of the first glass plate 22e, larger than the surface roughness of the second adhesion surface 22i of the second glass plate 22f.

Figure 7:
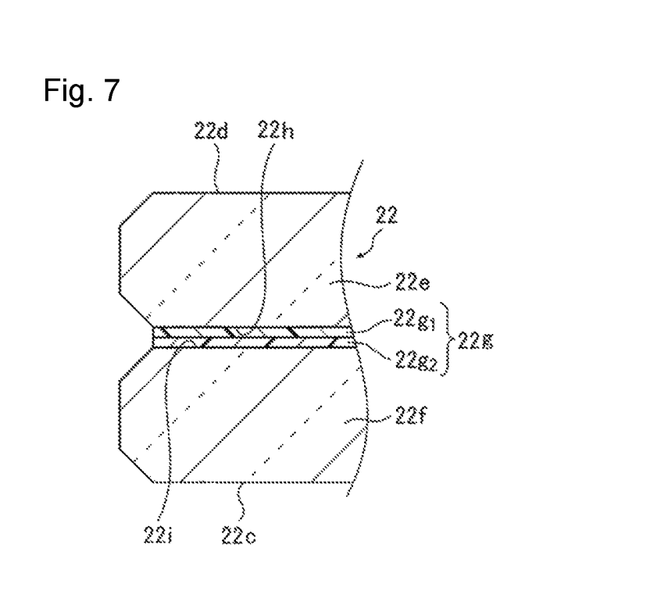
FIG. 7 is a schematic cross-sectional view showing, as enlarged, the edge of the cover member to illustrate a modified example of the intermediate film according to the second embodiment.

However, not limited to this method, for example, as will be described below, an intermediate film 22g having resins (resin 22gi and resin 22g2) different in adhesive force to a glass plate laminated, may be used.

In this embodiment, the surface roughness Ra of the first adhesion surface 22h of the first glass plate 22e is preferably at least 7 nm. Thus, in irregularities of the first adhesion surface 22h, the intermediate film 22g enters appropriately to provide an anchor effect, whereby the adhesive force F1 will be increased, and the safety will be more excellent.

In FIGS. 6 and 7, since the irregularities of the first adhesion surface 22h are sufficiently small as compared with the plate thickness of the glass plate, such irregularities are not shown.

For such a reason that the safety will be further excellent, the surface roughness Ra of the first adhesion surface 22h is more preferably at least 10 nm, further preferably at least 15 nm. The upper limit of the surface roughness Ra of the first adhesion surface 22h is not particularly limited, but is preferably at most 100 nm, more preferably at most 80 nm.

The surface roughness Rz of the first adhesion surface 22h is preferably from 80 to 700 nm, more preferably form 100 to 550 nm. The surface roughness Sa of the first adhesion surface 22h is preferably from 7 to 100 nm, more preferably from 10 to 100 nm, further preferably from 15 to 80 nm. The surface roughness Sz of the first adhesion surface 22h is preferably from 80 to 700 nm, more preferably from 100 to 550 nm.

In this embodiment, the surface roughness Ra of the second adhesion surface 22i of the second glass plate 22f is preferably at most 6 nm.

If the second adhesion surface 22i is roughened at a level of at least equal to the first adhesion surface 22h, there may be a case where visibility of a display image of the display panel 104 becomes insufficient, but by making the surface roughness Ra of the second adhesion surface 22i to be at most 6 nm, it is possible to make the visibility of the display image good.

For such a reason that the visibility can be made better, the surface roughness Ra of the second adhesion surface 22i is preferably at most 4 nm. The lower limit of the surface roughness Ra of the second adhesion surface 22i is not particularly limited, but is preferably at least 0.2 nm.

In FIGS. 6 and 7, since irregularities of the second adhesion surface 22i are sufficiently small as compared with the plate thickness of the glass plate, such irregularities are not shown.

The surface roughness Rz of the second adhesion surface 22i is preferably from 1 to 80 nm, more preferably from 5 to 60 nm. The surface roughness Sa of the second adhesion surface 22i is preferably at most 6 nm, more preferably from 0.2 to 6 nm, further preferably from 0.2 to 4 nm. The surface roughness Sz of the second adhesion surface 22i is preferably from 1 to 80 nm, more preferably from 5 to 60 nm.

The above surface roughness Rz, surface roughness Sa (arithmetic average roughness of the surface) and surface roughness Sz (maximum height of the surface) are values measured in accordance with ISO 25178. Specifically, these physical property values can be measured by using a scanning probe microscope (SPI3800N, manufactured by SII NanoTechnology Inc.).

The method for adjusting the surface roughness of the first adhesion surface 22h and/or the second adhesion surface 22i to be within the above range is not particularly limited. For example, it is possible to adjust the surface roughness by subjecting the first glass plate 22e and/or the second glass plate 22f to various treatments such as polishing treatment; etching treatment using high temperature HF (hydrogen fluoride) gas; etc.

In the case of conducting the etching treatment using HF gas, it is possible to control the surface roughness after the treatment, for example by changing the etching conditions such as the HF gas concentration (e.g. from 0.1 to 10 vol %), the temperature (etching temperature) of the glass plate during etching (e.g. from 400 to 800° C.) and the etching time (e.g. from 1 second to a few minutes).

"Intermediate Film"

For the intermediate film 22g, with respect to the resin and its thickness, the same ones as for the intermediate film 12g may be used. The intermediate film 22g may be composed of a plurality of layers.

FIG. 7 is a cross-sectional view of a cover member 22 to illustrate a modification of the intermediate film 22g. For example, as shown in FIG. 7, an intermediate film 22g having resins (resin 22gi and resin 22g2) different in adhesive force to a glass plate laminated, is used. Thus, it is possible to obtain a cover member 22 wherein the adhesive force F1 between the first glass plate 22e and the intermediate film 22g is larger than the adhesive force F2 between the second glass plate 22f and the intermediate film 22g.

"Tempered Glass"

It is preferred to use tempered glass for at least the first glass plate 22e among the first glass plate 22e and the second glass plate 22f that constitute the cover member 22.

As the tempered glass, tempered glass as described in the first embodiment may be used.

"Plate Thickness, Size and Shape"

The plate thicknesses of the first glass plate 22e and the second glass plate 22f that constitute the cover member 22 are, respectively, preferably from 0.5 to 2.5 mm.

The shape and size of the outer shape of the cover member 22 may suitably be decided in accordance with the outer shape of the in-vehicle display device. Of the in-vehicle display device, the outer shape is usually rectangular such as a rectangle, and in such a case, the outer shape of the cover member 22 is rectangular.

Depending upon the outer shape of the in-vehicle display device, it is possible to use a cover member 22 having a shape including a curve in the outer shape to cover the entire surface of the display surface of the display panel.

"Chamfer"

As shown in FIG. 6, the edges of the first glass plate 22e and the second glass plate 22f may be chamfered. The chamfer formed by this chamfering may be a C-chamfer or may be a R-chamfer.

"Method for Producing Cover Member"

The method for producing the cover member 22 being laminated glass (laminate) is the same as the known method for producing conventional laminated glass except for conducting adjustment of the surface roughness of the first adhesion surface 22h (and the second adhesion surface 22i).

Specifically, for example, first, adjustment of the surface roughness is applied to glass plates, and then, as the case requires, tempering treatment such as chemical tempering treatment is applied to obtain the first glass plate 22e and the second glass plate 22f. The adjustment of the surface roughness is as described above, and therefore, the description thereof is omitted here.

Thereafter, an intermediate film 22g is placed between the first glass plate 22e and the second glass plate 22f, followed by pressing under predetermined pressing conditions to obtain a laminated glass.

The pressing conditions are not particularly limited. For example, the pressing pressure is preferably from 0.5 to 3.0 MPa, more preferably from 1.0 to 2.0 MPa. The pressing temperature is preferably from 70 to 200° C., more preferably from 90 to 160° C. The pressing time is preferably from 5 to 60 minutes, more preferably from 10 to 40 minutes.

"Functional Layer"

Although not shown, it is preferred that a functional layer is formed on the front surface 12d, 22d and the rear surface 12c, 22c of the cover member 12, 22. This makes it possible to see a display image of the display panel 104 more clearly.

The functional layer may be formed by treating the surface of the cover member 12, 22, or by laminating another layer on the surface of the cover member 12, 22. As the functional layer, for example, an antireflection layer, an antiglare layer (AG layer), an anti-fingerprint layer (AFP layer), etc. may be mentioned.

(Antireflection Film)

By providing an antireflection film on the surface 12d, 22d of the cover member 12, 22, a display image of the display panel 104 can be made clear.

The material for the antireflection film is not particularly limited, and various materials can be utilized so long as they are materials capable of suppressing the reflection of light. For example, it may have a construction such that a high refractive index layer and a low refractive index layer are laminated. Here, the high refractive index layer is a layer having a refractive index of at least 1.9 at a wavelength of 550 nm, and the low refractive index layer is a layer having a refractive index of at most 1.6 at a wavelength of 550 nm.

The high refractive index layer and the low refractive index layer may, respectively, be composed of a single layer, or may, respectively, be composed of two or more layers. In a case where the high refractive index layer and the low refractive index layer are, respectively, composed of two or more layers, the construction is preferably such that high refractive index layers and low refractive index layers are alternately laminated.

The materials for the high refractive index layer and the low refractive index layer are not particularly limited and may be selected in consideration of the required antireflection degree, the productivity, etc.

As the material to constitute the high refractive index layer, for example, a material containing at least one member selected from the group consisting of niobium, titanium, zirconium, tantalum and silicon can be preferably used. Specifically, niobium oxide ($Nb_2O_5$), titanium oxide ($TiO_2$), zirconium oxide ($ZrO_2$), tantalum oxide ($Ta_2O_5$), silicon nitride, etc. may be mentioned.

As the material to constitute the low refractive index layer, for example, a material containing silicon can be preferably used. Specifically, silicon oxide ($SiO_2$), a material containing a mixed oxide of Si and Sn, a material containing a mixed oxide of Si and Zr, a material containing a mixed oxide of Si and Al, etc. may be mentioned.

The method for forming an antireflection film is not particularly limited, and various film formation methods may be used. Particularly it is preferred to conduct film formation by a method of e.g. pulse sputtering, AC sputtering, digital sputtering, etc. For example, at the time of conducting film formation by pulse sputtering, a glass substrate is placed in a chamber of a mixed gas atmosphere of an inert gas and oxygen gas, and a film can be formed thereto by selecting the target so that it will have a desired composition. The film thickness of the antireflection film is, for example, from about 100 to 300 nm.

(AG Layer)

When an AG layer is provided on the surface 12d, 22d of the cover member 12, 22, it is possible to reduce the glare of external light at the time of viewing a display image of the display panel 104, whereby it is possible to see the display image clearly. The method for forming an AG layer is not particularly limited and may, for example, be a method of etching the surface of the cover member 12, 22; a method of applying a coating solution containing fine particles and a matrix on the surface of the cover member 12, 22, followed by curing the matrix; etc.

(AFP Layer)

When an AFP layer is provided on the surface 12d, 22d of the cover member 12, 22, even if the surface 12d, 22d of the cover member 12, 22 is touched by a hand, no finger prints will remain on the surface 12d, 22d, whereby it is possible to keep the surface 12d, 22d clean. Therefore, at the time of viewing a display image of the display panel 104, it is possible to see the display image clearly.

As the functional layer, a light shielding layer may be mentioned as another example. A light shielding layer is preferably provided on the rear surface 12c, 22c of the cover member 12, 22. By forming the light shielding layer, it is possible to hide the wiring of the display panel 104, or the joint portion between the display panel 104 and the cover member 12, 22, whereby it is possible increase the design quality of the display device. The above light shielding layer may be formed, for example, by applying a print coating material to the peripheral edge of the rear surface 12c, 22c of the cover member 12, 22 by using a method such as a screen printing method, followed by drying.

EXAMPLES

Hereinafter, the present invention will be specifically described with reference to Examples. However, the present invention is not limited by these Examples. Here, Ex. 1 and 2 are Examples of the cover member according to the first embodiment, and Ex. 3 is a Comparative Example. Ex. 4 to 8 are Examples of the cover member according to the second embodiment, and Ex. 9 is a Comparative Example.

Ex. 1

"First Glass Plate"

First, a glass plate was prepared. As the glass plate, glass for chemical tempering based on aluminosilicate glass (manufactured by Asahi Glass Company, Limited, Dragontrail, thickness: 1.1 mm) obtained by cutting after molding by a float method, was used.

Against this glass plate, by using a chamfering wheel with a grain size of #600, chamfering of the edge was carried out to form a chamfered portion including a first inside chamfer 13d.

The surface roughness Ra of the first inside chamfer 13d was 230 nm.

Next, against this glass plate, chemical tempering treatment was carried out. The chemical tempering treatment was conducted by immersing the entire glass plate in $KNO_3$ molten salt, so that the thickness (DOL) of the compressive stress layer became 35 μm and the surface compressive stress (CS) in the compressive stress layer became 750 MPa. Thus, a first glass plate 12e being chemically tempered glass was obtained.

"Second Glass Plate"

In the same manner as the first glass plate 12e, a second glass plate 12f was obtained. Here, the inside chamfer 13e of the second glass plate 12f was also the same as in the first glass plate 12e, and its surface roughness Ra was 230 nm.

"Production of Laminated Glass"

Between the first glass plate 12e and the second glass plate 12f, an intermediate film 12g was disposed. As the intermediate film 12g, an intermediate film made of PVB (polyvinyl butyral) (manufactured by SEKISUI CHEMICAL CO., LTD., "S-LEC", thickness: 0.76 mm) was used.

In this state, under conditions of a pressure of 1.3 MPa and a temperature of 130° C., pressing was conducted for 20 minutes to obtain a laminated glass. A protruding edge of the intermediate film 12g in the obtained laminated glass was cut off.

"Disposition of Resin"

The same intermediate film as the intermediate film 12g used in the production of the laminated glass was prepared, and by heating (130° C., 20 minutes) and melting it, a resin 19 in a molten state was obtained. This resin 19 in a molten state was applied to a recess formed by the first inside chamfer 13d, the edge surface of the intermediate film 12g and the second inside chamfer 13e, in the laminated glass as prepared above, and then cured in the process of returning to normal temperature. Thus, the resin 19 was adhered to the first inside chamfer 13d, the edge surface of the intermediate film 12g and the second inside chamfer 13e, to obtain a cover member 12.

In the obtained cover member 12, the protruding amount of the resin 19 from the side surface position of the first glass plate 12e and the second glass plate 12f was at most 0.1 mm.

Ex. 2

The first glass plate 12e was differentiated from that in Ex. 1.

Specifically, in Ex. 1, at the time of obtaining the first glass plate 12e, against the glass plate, by using a chamfering wheel with a grain size of #325, chamfering of the edge was carried out to form a chamfered portion including an inside chamfer 13d. The surface roughness Ra of the first inside chamfer 13d was 400 nm. Here, the inside chamfer 13e of the second glass plate 12f was also the same as in the first glass plate 12e, and its surface roughness Ra was 400 nm.

Except for the above aspects, in the same manner as in Ex. 1, a cover member 12 was obtained.

Ex. 3

A cover member 12 in Ex. 3 was obtained in the same manner as in Ex. 1 except that the resin 19 was not disposed.

<Preparation of Test Specimen>

In order to conduct a test of colliding a rigid model (referred to also as a head impact test), a test specimen 200 of an in-vehicle display device was prepared by using the cover member 12, 22 in each Ex.

Figure 8:
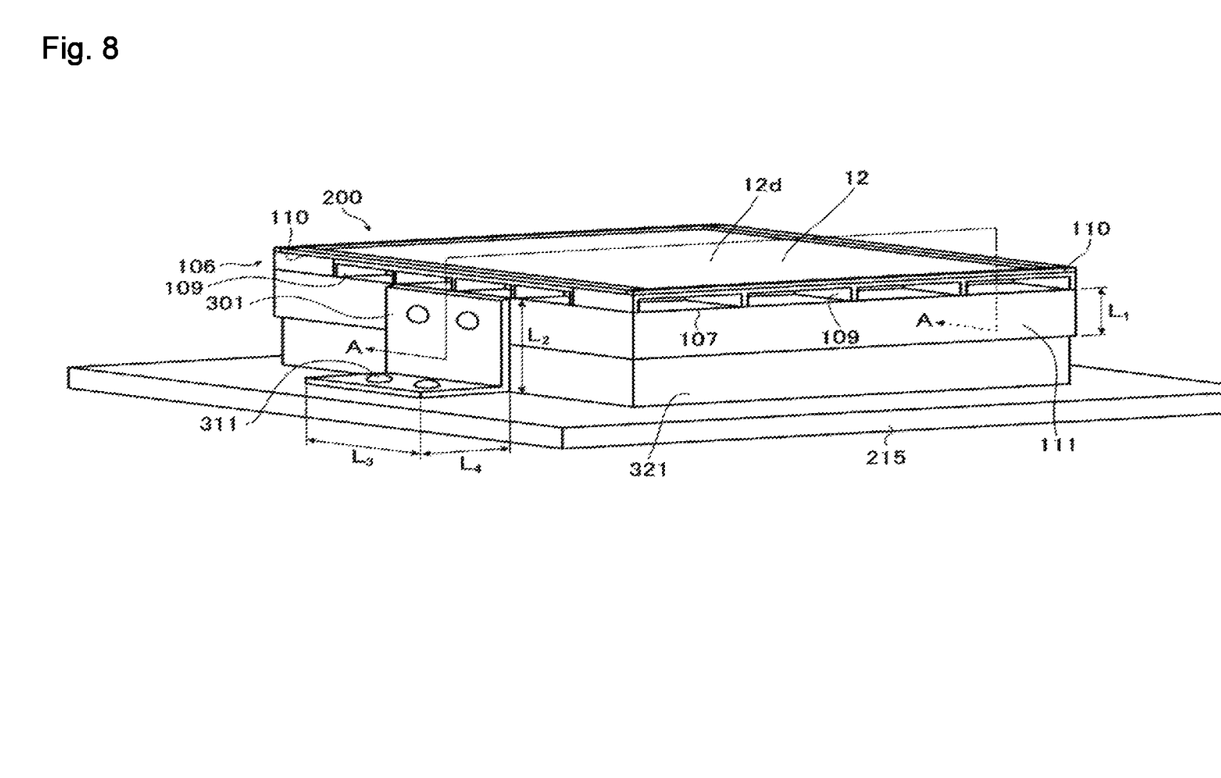
FIG. 8 is a perspective view showing a test specimen of an in-vehicle display device used in Ex. as described later.
Figure 9:
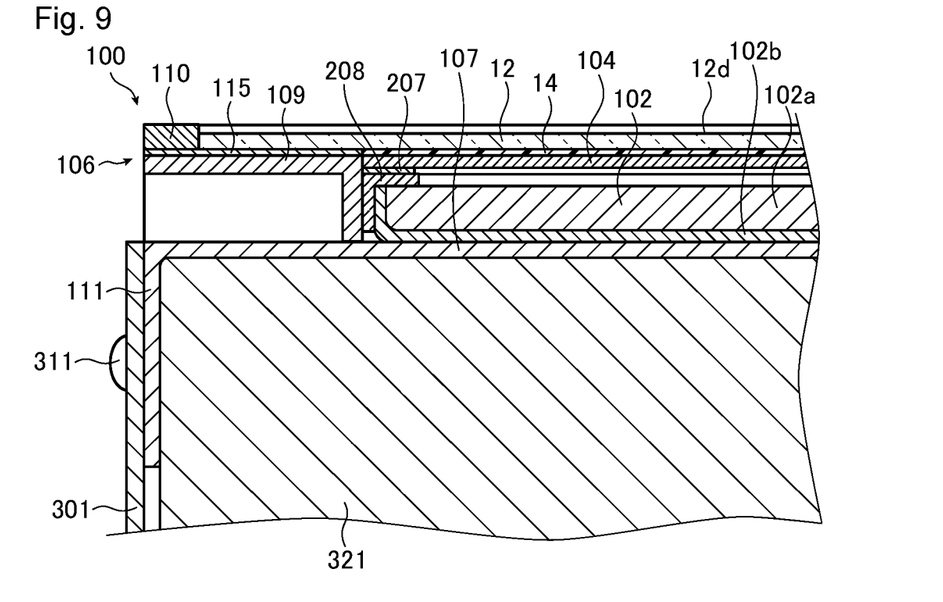
FIG. 9 is a schematic cross-sectional view taken along line A-A of the test specimen in FIG. 8.
Figure 10:
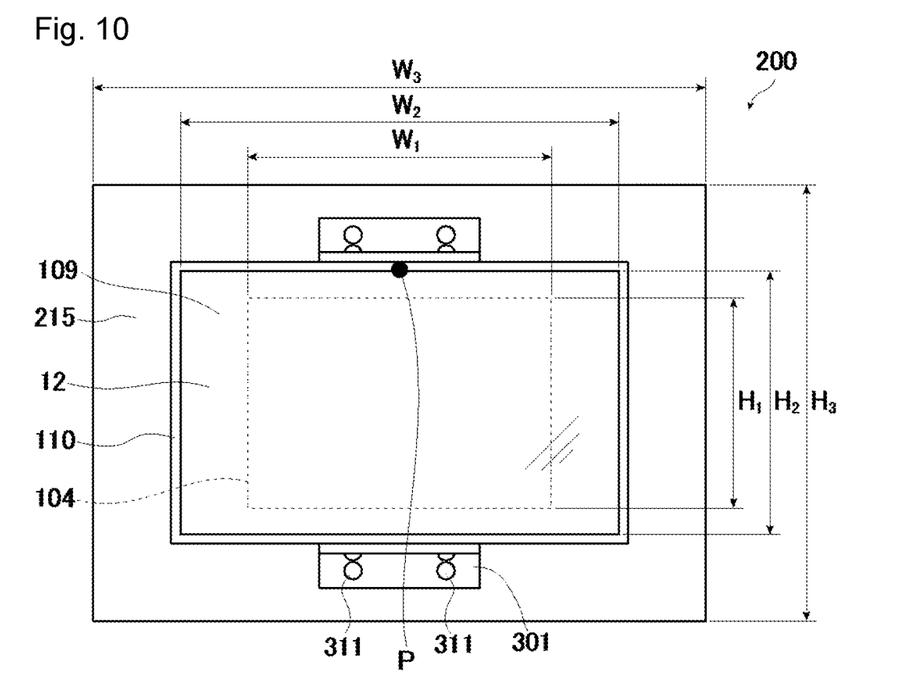
FIG. 10 is a schematic plan view of the test specimen in FIG. 8.

The test specimen 200 will be described with reference to FIGS. 8 to 10. In FIGS. 8 to 10, the same (or corresponding) portions as in the in-vehicle display device 100 in FIG. 1 will be represented by the same reference symbols, and the description will sometimes be omitted.

FIG. 8 is a perspective view showing a test specimen 200. FIG. 9 is a cross-sectional view along line A-A in FIG. 8. FIG. 10 is a plan view showing the test specimen 200.

As shown in FIGS. 8 and 9, the test specimen 200 has a housing bottom plate 107, and on the periphery of the housing bottom plate 107, four housing frames 109 internally provided with ribs are disposed. By the housing bottom plate 107 and four housing frames 109, a housing 106 having a rectangular recess at the central region is formed, and in this housing 106, a backlight unit 102 and a display panel 104 are placed.

As shown in FIG. 9, the edge at the upper surface side of the backlight unit 102 is covered by an L-shaped member 208 with a L-shape in cross section. The upper surface of the L-shaped member 208 and the edge at the lower surface side of the display panel 104 are bonded by a double-sided adhesive tape 207. Thus, between the display panel 104 and the backlight unit 102, an air gap (1.5 mm) is present corresponding to the thickness of the L-shaped member 208 and the double-sided tape 207. An adhesive layer 14 is bonded on the upper surface of the display panel 104. The lower surface of the cover member 12, 22 and the upper surface of the housing frame 109 are bonded by a double-sided adhesive tape 115. At the outside of the edge surface of the cover member 12, 22 and on the upper surface of the housing frame 109, a housing edge frame 110 is disposed. The housing edge frame 110 is also bonded to the housing frame 109 by a double-sided adhesive tape 115.

As shown in FIGS. 8 and 9, at the four sides of the housing bottom plate 107, continuously from the housing bottom plate 107, a plate-shaped housing protrusions 111 are provided. By the housing bottom plate 107 and the four housing protrusions 111, a recess is formed on the back surface side of the housing bottom plate 107 (opposite side to the backlight unit 102 side). In this recess, a portion of a cushion material 321 is inserted. The cushion material 321 is disposed on a flat support plate 215, and by the cushion material 321, the housing 106 is supported. The cushion material 321 was prepared by laminating two sheets of "CF45" (thickness: 25.4 mm) manufactured by K.C.C. SHOKAI LIMITED. In a state where the housing 106 is supported by the cushion material 321, to the pair of housing protrusions 111 facing each other, one end side of a fixing portion 301 is joined by bolts 311. The other end of the fixing portion 301 is joined to the support plate 215 by bolts 311. Thus, housing 106 including the housing protrusions 111 is fixed in position by the fixing portion 301.

With respect to the fixing portion 301 being a plate member of L-shape in cross-section, the sizes represented by $L_1$ to $L_4$ in FIG. 8 were set to be $L_1$: 20 mm, $L_2$: 50 mm, $L_3$: 100 mm, $L_4$: 20 mm.

The sizes represented by $H_1$ to $H_3$ and $W_1$ to $W_3$ in FIG. 10 were set to be $H_1$: 120 mm, $H_2$: 150 mm, $H_3$: 250 mm, 173 mm, $W_2$: 250 mm, $W_3$: 350 mm.

Other portions were as follows.

Adhesive layer 14: OCA (manufactured by NICHIEI KAKOH CO., LTD. "MHM-FWD", thickness: 150 μm)

Display panel 104: A substitute having polarizing plate (material: TAC) bonded to each side of a soda-lime glass (thickness: 1.1 mm, size: 173 mm×120 mm) was used.

Backlight unit 102: A substitute having the bottom surface and four side surfaces of a plate member 102a (material: PC (polycarbonate), plate thickness: 4 mm, size: 117 mm×170 mm) covered by a concave body 102b (material: aluminum, plate thickness: 1 mm) was used.

Double-sided adhesive tape 207: Material: PET, tape width: 5 mm, tape thickness: 0.5 mm L-shaped member 208: Material: PVC, plate thickness: 1 mm, length of one side of L-shape: 5 mm Housing frame 109: Material: ABS, plate thickness: 2 mm Housing edge frame 110: Material: ABS, plate thickness: 2.5 mm, plate width: 5 mm Double-sided adhesive tape 115: Material: PET, tape thickness: 0.5 mm Fixing portion 301: Material: iron (SS400), plate thickness: 1.0 mm Bolts 311: Material: iron Support plate 215: Material: iron, plate thickness: 9 mm Housing bottom plate 107 and housing protrusions 111: Material: iron, plate thickness: 1.15 mm <Head Impact Test>

Using the prepared test specimen 200, the head impact test was conducted as follows.

The support plate 215 of the test specimen 200 was placed on a horizontal surface, and a spherical rigid model (material: iron, diameter: 165 mm, weight: 19.6 kg) not shown was dropped from a height of 793 mm at a collision speed of 3.944 m/s to a collision position P (see FIG. 10) on the surface 12d, 22d of the cover member 12, 22 so that the collision energy would be 152.4 J.

For the test method, reference was made to "Technical standards for impact absorption of instrument panel in Exhibit 28" of "Article 20 riding device" in the "Safety standards for road vehicles" (hereinafter referred to simply as "Standards") published by Ministry of Land, Infrastructure and Transport. In the "Standards", a spherical rigid model (material: iron, diameter: 165 mm, weight: 6.8 kg) was injected for collision at an impact velocity of 6.7 m/s so that the energy at the time of the collision would be 152.4 J. That is, in the head impact test using the test specimen 200, an adjustment was made so that the energy of the collision would be equal to the "Standards".

With respect to the deceleration of the rigid model, it is stipulated not to exceed 784 m/s$^2$ (80 G) continuously for 3 ms (milliseconds), and in the tests carried out this time, it was confirmed that all cases fulfilled this requirement.

The collision position P (see FIG. 10) on the cover member 12, 22 for collision of the rigid model, was set to be, as observing the test piece 200 from the top surface, at a position closer to one fixed portion 301 side from the center position and within 1 mm from the most edge portion of the cover member 12, 22.

<Evaluation of Edge Safety>

Using the cover member 12, 22 of each Ex., a test specimen 200 was prepared and subjected to the head impact test. After the head impact test, with respect to broken fragments of the first glass plate 12e, 22e, it was confirmed whether or not sharp broken fragments remained without being scattered. Here, a "sharp broken fragment" is meant for a "broken fragment having a corner with a radius of curvature being less than 2.5 mm". Further, the rising amount (the distance from the surface 12d, 22d) of forward ends of broken fragments, etc. of the first glass plate 12e, 22e was also measured.

A case where sharp broken fragments were not scattered, and the maximum value of the rising amount was less than 1.5 mm, was represented by "A", a case where the maximum value of the rising amount was less than 3.2 mm was represented by "B", and a case where sharp broken fragments were scattered was represented by "C", in the following Table 1. The case of "A" or "B" can be evaluated to be excellent in edge safety.

TABLE 1

| | | Resin | | |
|---|---|---|---|---|
| | First inside chamfer Ra [nm] | Presence or absence | Protrusion of resin | Evaluation Edge safety |
| Ex. 1 | 230 | Present | At most 0.1 mm | B |
| Ex. 2 | 400 | Present | At most 0.1 mm | A |
| Ex. 3 | 230 | Absent | — | C |

As shown in Table 1, in Ex. 3 wherein no resin 19 was adhered to the first inside chamfer 13d of the first glass plate 12e, the edge safety was insufficient. In contrast, Ex. 1 and 2 having the resin 19 adhered to the first inside chamfer 13d of the first glass plate 12e, were excellent in the edge safety. Further, when Ex. 1 and 2 are compared, Ex. 2 in which the surface roughness Ra of the first inside chamfer 13d was larger, was superior in the edge safety to Ex. 1.

Further, in both Ex. 1 and 2, since the protrusion of the resin 19 was at most 0.1 mm, it is possible to prevent occurrence of a problem during the construction (e.g. a problem such that due to the protrusion of the resin 19, the cover member 12 cannot be accommodated into the case).

Ex. 4

"First Glass Plate"

In the same manner as in Ex. 1, glass for chemical tempering (manufactured by Asahi Glass Company, Limited "Dragontrail", thickness: 1.1 mm) was prepared as a glass plate.

Next, the surface to be a first adhesion surface 22h in this glass plate was subjected to etching treatment (etching temperature: 580° C., etching time: 10 seconds) by using HF gas (nitrogen+3.1 vol % HF).

Thereafter, this glass plate was subjected to chemical tempering treatment. The chemical tempering treatment was conducted by immersing the entire glass plate in $KNO_3$ molten salt so that the thickness (DOL) of the compressive stress layer would be 35 μm and the surface compressive stress (CS) in the compressive stress layer would be 750 MPa (the same applies hereinafter). Thus, a first glass plate 22e being chemically tempered glass was obtained.

The first adhesion surface 22h of the first glass plate 22e had a surface roughness Ra of 37 nm, a surface roughness Rz of 330 nm, a surface roughness Sa of 37 nm, and a surface roughness Sz of 330 nm.

The surface roughness Ra, the surface roughness Rz, the surface roughness Sa and the surface roughness Sz were measured by using a scanning probe microscope (SPI3800N, manufactured by SII NanoTechnology Inc.), followed by chemical tempering treatment. Measurements were conducted with respect to a 2 μm square region of the glass plate, and the number of acquired data was set to 1024×1024.

"Second Glass Plate"

The surface to be a second adhesion surface 22i in the prepared glass plate (the same as the first glass plate) was subjected to etching treatment (etching temperature: 580° C., etching time: 10 seconds) by using HF gas (nitrogen+0.4 vol % HF). Thus, a second glass plate 22f being chemically tempered glass was obtained.

The second adhesion surface 22i of the second glass plate 22f had a surface roughness Ra of 6 nm, a surface roughness Rz of 73 nm, a surface roughness Sa of 6 nm, and a surface roughness Sz of 73 nm.

"Production of Laminated Glass"

An intermediate film 22g was disposed between the first glass plate 22e and the second glass plate 22f. As the intermediate film 12g, an intermediate film made of PVB (polyvinyl butyral) (manufactured by SEKISUI CHEMICAL CO., LTD., "S-LEC", thickness: 0.76 mm) was used (the same applies hereinafter).

In this state, pressing for 20 minutes was conducted under conditions of a pressure of 1.3 MPa and a temperature of 130° C., to obtain a cover member 22 being a laminated glass.

Ex. 5 to 9

Cover members 22 in Ex. 5 to 9 were obtained in the same manner as in Ex. 4 except that conditions for the etching treatment using HF gas at the time of obtaining the first glass plate 22e and the second glass plate 22f were set to be as shown in Table 2. Further, a case where the etching treatment using HF gas was not conducted, was identified by "-" in the following Table 2.

The surface roughnesses (Ra, Rz, Sa and Sz) of the first adhesion surface 22h of the first glass plate 22e and the second adhesion surface 22i of the second glass plate 22f used in each Ex., were measured in the same manner as in Ex. 4. The measurement results are shown in the following Table 3.

<Adhesive Force>

With respect to the cover members 22 in Ex. 4 to 9, the adhesive force F1 between the first glass plate 22e and the intermediate film 22g, and the adhesive force F2 between the second glass plate 22f and the intermediate film 22g, are shown in the following Table 3.

The adhesive force F1 was measured by a 180° peel test. More specifically, first, to the first adhesion surface 22h in the first glass plate 22e (size 100 mm×25 mm), one surface of the intermediate film 22g (200 mm×25 mm, thickness: 0.76 mm) was bonded. At that time, one half in the longitudinal direction of the intermediate film 22g was overlapped with the first glass plate 22e, and the other half was in a state of being protruded from the first glass plate 22e.

Then, to the other surface of the intermediate film 22g, a PET film (size: 200 mm×25 mm, thickness: 100 μm) of the same size as the intermediate film 22g was superposed. Thereafter, pressing was conducted under conditions at the time of obtaining the cover member 22, to obtain a sample.

In the obtained sample, the intermediate film 22g and the PET film protruding from the first glass plate 22e, were folded back at 180° to carry out a tensile test at a speed of 50 mm/min, whereby the adhesive force F1 (unit: N/25 mm) between the first glass plate 22e and the intermediate film 22g was obtained.

The adhesive force F2 was also measured by a 180° peel test in the same manner as the adhesive force F1.

More specifically, first, to the second adhesion surface 22i in the second glass plate 22f (size: 100 mm×25 mm), one surface of the intermediate film 22g (200 mm×25 mm, thickness: 0.76 mm) was bonded. At that time, one half in the longitudinal direction of the intermediate film 22g was overlapped with the second glass plate 22f, and the other half was in a state of protruding from the second glass plate 22f.

Then, to the other surface of the intermediate film 22g, a PET film (size: 200 mm×25 mm, thickness: 100 μm) of the same size as the intermediate film 22g was superposed. Thereafter, pressing was conducted under conditions at the time of obtaining the cover member 22, to obtain a sample.

In the obtained sample, the intermediate film 22g and the PET film protruding from the second glass plate 22f, was folded back at 180° to carry out a tensile test at a speed of 50 mm/min, whereby the adhesive force F2 (unit: N/25 mm) between the second glass plate 22f and the intermediate film 22g was obtained.

<Evaluation of Edge Safety>

With respect to each cover member 22 obtained in Ex. 4 to 9, in the same manner as the cover member 12 obtained in the above Ex. 1 to 3, the test specimen 200 shown in the above-described FIGS. 8 to 10, was prepared and subjected to the head impact test.

<Evaluation of Visibility>

Using a haze meter (manufactured by Suga Test Instruments Co., Ltd. "HZ-2"), the haze (turbidity) of the cover member 22 in each of Ex. 4 to 9 was measured. The measurement of the haze was in accordance with JIS K7361-1. As the light source, C light source was used. As a result of the measurement, a case where the haze was at most 0.6%, was represented by "A", and a case where the haze exceeded 0.6%, was represented by "B", in the following Table 3. "A" can be evaluated to be better than "B" in the visibility of a display image of the display panel 104. A case where no evaluation was conducted, was indicated by "-" in the following Table 3.

TABLE 2

|  |  | Etching treatment using HF gas | | |
|---|---|---|---|---|
|  |  | HF concentration [vol %] | Etching temperature [° C.] | Etching time [seconds] |
| Ex. 4 | First glass plate | 3.1 | 580 | 10 |
|  | Second glass plate | 0.4 | 580 | 10 |
| Ex. 5 | First glass plate | 0.7 | 580 | 10 |
|  | Second glass plate | 0.4 | 580 | 10 |
| Ex. 6 | First glass plate | 1.0 | 580 | 10 |
|  | Second glass plate | 0.4 | 580 | 10 |
| Ex. 7 | First glass plate | 1.0 | 580 | 10 |
|  | Second glass plate | — | | |
| Ex. 8 | First glass plate | 3.1 | 580 | 10 |
|  | Second glass plate | 0.7 | 580 | 10 |
| Ex. 9 | First glass plate | — | | |
|  | Second glass plate | 3.1 | 580 | 10 |

TABLE 3

|  |  | Surface roughness | | | | Adhesive force | Evaluation | |
|---|---|---|---|---|---|---|---|---|
|  |  | Ra [nm] | Rz [nm] | Sa [nm] | Sz [nm] | to intermediate film [N/25 mm] | Safety | Visibility |
| Ex. 4 | First glass plate | 37 | 330 | 37 | 330 | F1: 45.9 | A | A |
|  | Second glass plate | 6 | 73 | 6 | 73 | F2: 12.1 | | |
| Ex. 5 | First glass plate | 14 | 115 | 14 | 115 | F1: 23 | B | A |
|  | Second glass plate | 6 | 73 | 6 | 73 | F2: 12.1 | | |
| Ex. 6 | First glass plate | 19 | 153 | 19 | 153 | F1: 23.7 | A | A |
|  | Second glass plate | 6 | 73 | 6 | 73 | F2: 12.1 | | |
| Ex. 7 | First glass plate | 19 | 153 | 19 | 153 | F1: 23.7 | A | A |
|  | Second glass plate | 0.3 | 3 | 0.3 | 3 | F2: 5.7 | | |
| Ex. 8 | First glass plate | 37 | 330 | 37 | 330 | F1: 45.9 | A | B |
|  | Second glass plate | 14 | 115 | 14 | 115 | F2: 23 | | |
| Ex. 9 | First glass plate | 0.3 | 3 | 0.3 | 3 | F1: 5.7 | C | — |
|  | Second glass plate | 37 | 330 | 37 | 330 | F2: 45.9 | | |

As shown in Table 3, Ex. 9 wherein the adhesive force F1 was smaller than the adhesive force F2, was insufficient in safety. In contrast, Ex. 4 to 8 wherein the adhesive force F1 was larger than the adhesive force F2, were excellent in safety.

This application is a continuation of PCT Application No. PCT/JP2017/027541, filed on Jul. 28, 2017, which is based upon and claims the benefit of priority from Japanese Patent Application No. 2016-152756 filed on Aug. 3, 2016 and Japanese Patent Application No. 2016-202684 filed on Oct. 14, 2016. The contents of those applications are incorporated herein by reference in their entireties.

REFERENCE SYMBOLS 12, 22: Cover member, 12c, 22c: rear surface of the cover member, 12d, 22d: front surface of the cover member, 12e, 22e: first glass plate, 12f, 22f: second glass plate, 12g, 22g: intermediate film, 22g: intermediate film, 22gi: resin, 22g2: resin, 22h: first adhesion surface, 22i: second adhesion surface, 13d: first inside chamfer, 13e: second inside chamfer, 13f: side surface, 13g: side surface, 14: adhesive layer, 19: resin, 100: in-vehicle display device, 102: backlight unit, 104: display panel, 106: housing, 107: housing bottom plate, 109: housing frame, 110: housing edge frame, 111: housing protrusion, 115: double-sided adhesive tape, 200: test specimen, 207: double-sided adhesive tape, 208: L-shaped member, 215: support plate, 301: fixing portion, 311: bolt, 321: cushion material, P: collision position

What is claimed is:

1. A cover member, which is a laminate comprising:
a first glass plate forming a front surface of the cover member;
a second glass plate forming a rear surface of the cover member; and
an intermediate film interposed between the first and second glass plates and bonding the first and second glass plates such that an adhesive force between the first glass plate and the intermediate film is larger than an adhesive force between the second glass plate and the intermediate film, wherein
the first glass plate has a first surface adjacent to the intermediate film, the second glass plate has a second surface adjacent to the intermediate film, and the first surface has a surface roughness different from a surface roughness of the second surface,
the first glass plate has a first inside chamfer on a side of the intermediate film,
the first inside chamfer is bonded to the second glass plate or the intermediate film by a resin, and
the cover member is suitable for covering a display panel of a display device such that the front surface does not face the display panel and the rear surface faces the display panel.

2. The cover member according to claim 1, wherein a surface roughness Ra of the first inside chamfer is at least 100 nm.

3. The cover member according to claim 1, wherein the second glass plate has a second inside chamfer on a side of the intermediate film, and
the resin is adhered to the second inside chamfer.

4. The cover member according to claim 1, wherein a protruding amount of the resin from side surface positions of the first glass plate and the second glass plate is at most 0.1 mm.

5. The cover member according to claim 1, wherein the resin is the same resin as a resin constituting the intermediate film.

6. The cover member according to claim 1, wherein a surface roughness Ra of the first inside chamfer is at most 500 nm.

7. The cover member according to claim 1, wherein the first glass plate is a tempered glass.

8. The cover member according to claim 7, wherein the tempered glass is a chemically tempered glass having a compressive stress layer with a thickness of at least 10 μm.

9. The cover member according to claim 1, wherein each of the first and second glass plates has a thickness of from 0.5 to 2.5 mm.

10. The cover member according to claim 1, wherein the intermediate film comprises at least one selected from the group consisting of polyvinyl butyral and ethylene vinyl acetate.

11. The cover member according to claim 5, wherein the intermediate film comprises at least one selected from the group consisting of polyvinyl butyral and ethylene vinyl acetate.

12. The cover member according to claim 1, wherein the resin comprises at least one selected from the group consisting of an acrylic resin, a silicone resin, an urethane acrylate resin and an epoxy resin.

13. The cover member according to claim 1, wherein each of the first and second glass plates has a thickness of from 1.3 to 2.5 mm.

14. The cover member according to claim 1, wherein the first surface of the first glass plate has a surface roughness Ra which is greater than a surface roughness Ra of the second surface of the second glass plate.

15. The cover member according to claim 1, wherein the first surface of the first glass plate has surface roughness Ra, Rz, Sa, and Sz which are greater than surface roughness Ra, Rz, Sa, and Sz of the second surface of the second glass plate, respectively.

16. The cover member according to claim 1, wherein the adhesive force between the first glass plate and the intermediate film is at least 23 N/25 mm, and the adhesive force between the second glass plate and the intermediate film is at least 5.7 N/25 mm.

17. The cover member according to claim 5, wherein the intermediate film consists of the resin.

18. The cover member according to claim 1, wherein the intermediate film consists of polyvinyl butyral or ethylene vinyl acetate.

19. A display device, comprising:
a cover member of claim 1; and
the display panel.

20. The display device according to claim 19, which is an in-vehicle display device.

* * * * *